United States Patent
Li et al.

(10) Patent No.: US 10,020,731 B2
(45) Date of Patent: Jul. 10, 2018

(54) POWER SWITCH CIRCUIT

(71) Applicant: DELTA ELECTRONICS, INC., Taoyuan Hsien (CN)

(72) Inventors: Zeng Li, Taoyuan Hsien (CN); Chaofeng Cai, Taoyuan Hsien (CN)

(73) Assignee: DELTA ELECTRONICS, INC., Taiwan (CN)

( * ) Notice: Subject to any disclaimer, the term of this patent is extended or adjusted under 35 U.S.C. 154(b) by 121 days.

(21) Appl. No.: 14/959,071

(22) Filed: Dec. 4, 2015

(65) Prior Publication Data

US 2016/0314914 A1 Oct. 27, 2016

(30) Foreign Application Priority Data

Apr. 21, 2015 (CN) .......................... 2015 1 0190456

(51) Int. Cl.
*H01H 19/64* (2006.01)
*H02M 3/158* (2006.01)
*H02M 1/00* (2006.01)

(52) U.S. Cl.
CPC .... *H02M 3/158* (2013.01); *H02M 2001/0054* (2013.01); *Y02B 70/1491* (2013.01)

(58) Field of Classification Search
None
See application file for complete search history.

(56) References Cited

U.S. PATENT DOCUMENTS

| 6,211,657 | B1 | 4/2001 | Goluszek et al. |
| 6,577,109 | B2 | 6/2003 | Dancy et al. |
| 6,784,644 | B2 | 8/2004 | Xu et al. |
| 7,423,894 | B2 * | 9/2008 | Ilic ...................... H02M 3/1584 363/132 |
| 2002/0118000 | A1 * | 8/2002 | Xu ........................ H02M 3/158 323/259 |
| 2012/0250363 | A1 | 10/2012 | Skinner | | |

FOREIGN PATENT DOCUMENTS

| CN | 103166615 A | 6/2013 |
| CN | 104247266 A | 12/2014 |

OTHER PUBLICATIONS

The 1st office action issued in the counterpart CN application No. 201510190456.3 dated Mar. 29, 2018, by the SIPO. (No English translation for the Chinese Office Action).

\* cited by examiner

*Primary Examiner* — Long Nguyen
(74) *Attorney, Agent, or Firm* — Yunling Ren

(57) ABSTRACT

A power switch circuit includes at least one switch unit including at least one first switch and one second switch which are connected in parallel. A turning-on loss of the first switch is smaller than a turning-on loss of the second switch, a turning-off loss of the first switch is larger than a turning-off loss of the second switch; during one controlling period of the switch unit, when the switch unit is controlled to be turned on, a moment when the first switch is turned on is controlled to be earlier than a moment when the second switch is turned on; and when the switch unit is controlled to be turned off, a moment when the first switch is turned off is controlled to be earlier than a moment when the second switch is turned off.

7 Claims, 14 Drawing Sheets

POWER SWITCH CIRCUIT

CROSS REFERENCE

This application claims priority under 35 U.S.C. § 119 to Chinese Patent Application No. 201510190456.3, filed on Apr. 21, 2015, the entire contents of which are incorporated herein by reference.

TECHNICAL FIELD

The present disclosure relates to the field of power switch circuits.

BACKGROUND

Modern power electronic device is an essential part of a device applied in the industries of modern electric power, electronics, electric motors and energy sources. The power conversion efficiency of the power electronic device is always an important goal pursued, which can also be represented by a loss of the device.

A power semiconductor device is a core component of a modern power electronic device, the loss of the power semiconductor device is the most important constituent part of the loss of the modern power electronic device, and the performance of the power semiconductor device directly determines the reliability and conversion efficiency of the power electronic device. In order to design a power electronic device with higher performance, a power semiconductor device with a low power loss is desired.

A power switch circuit, of various circuit topologies are employed in modern power electronic devices according to various practical operation conditions, such as a Buck circuit, a Boost circuit, a half-bridge circuit, a diode-clamping three-level circuit, a T-Type three-level circuit, etc., which are commonly used. It is well known for those skilled in the art that a power switch circuit typically includes at least one switch and one controller, wherein power conversion, such as conversion between DC and DC or conversion between DC and AC, can be achieved by turning on and turning off the switch under control signal of the controller.

The switch of the power switch circuit with the above described circuit typically operates in an on state or an off state, and the loss of the switch is mainly consisted of two parts: a conduction loss and a switching loss. When the switch is in an on state, the current flowing through the switch causes the conduction loss; when the switch is being switched from the on-state to the off-state, or switched from the on-state to the off-state, the switching loss of the device will be generated. The switching loss can be further divided into: a turning-off loss generated during the switching from the on-state to the off-state, and a turning-on loss generated during the switching from the off-state to the on-state.

In practical operation, the turning-on loss is related to the switch itself, the parasitic inductance, and the reverse recovery charge of the fly-wheel diode. The turning-off loss is related to the switch itself and the parasitic inductance, but is less related to the forward turning-on of the fly-wheel diode.

Take the Buck circuit as an example. The Buck circuit in the related art is illustrated in FIG. 1, including a switch 1-1, a fly-wheel diode D, an parasitic inductor Ls connected in series with the switch 1-1, an input Voltage Vin, an input capacitor Cdc, an output filtering inductor Lo and an output load (Load). The conversion of power supply is achieved by controlling the turning on and turning off of the switch 1-1.

The input voltage Vin of the Buck circuit is connected in parallel with the input capacitor Cdc and has a positive voltage terminal P and a negative voltage terminal N. The branch of the switch 1-1 and the parasitic inductor Ls connected in series is connected to a positive voltage terminal P, the fly-wheel diode D is connected to a negative voltage terminal N, and a midpoint between the switch 1-1 and the fly-wheel diode D is connected with the output filtering inductor Lo and the output load (Load).

The switch 1-1 can operates in an on state or an off state through control of a gate G.

When the switch 1-1 is turned on, a current flows from an input terminal and the input capacitor Cdc to the output filtering inductor Lo and the output load (Load) through the switch 1-1, thus the turning-on loss is generated in the switch 1-1. The parasitic inductor Ls can slow down the rate of change of the turning on current in the switch 1-1 and make the change of current lag to be behind the change of voltage, reduce the time period during which the changed current is overlapped with the changed voltage, and decrease the turning-on loss of the power switch device, but will also reduce the speed of turning on. On the other hand, the parasitic inductor Ls will reduce the rate of change of current in the reverse recovery process, and cause a lower reverse current and reduce the reverse recovery loss. Thus, increasing the inductance value of the parasitic inductor Ls can reduce the turning-on loss.

When the switch 1-1 is turned off, the current flowing through the switch 1-1 is blocked. In the current of the output filtering inductor Lo and the output load (Load), the current flowing through the parasitic inductor Ls and the switch 1-1 is reduced and the forward current of the fly-wheel diode D is increased. The turning-off loss of the switch 1-1 is generated in this process. The parasitic inductor Ls can slow down the rate of change of the turning off current in the switch 1-1, prolong the time period during which the changed current is overlapped with the changed voltage, and increase the turning-off loss of the power switch device.

Thus, the effect of the parasitic inductor on the loss can be described as follows: in the process of turning on the switch, the parasitic inductor will reduce the turning-on loss; and in the process of turning off the switch, the parasitic inductor will increase the turning-off loss.

Conventionally, the method for reducing the loss of the power semiconductor device includes:

1. Designing a suitable parasitic inductor, taking both of the turning-on loss and the turning-off loss into account. However this method cannot achieve both of a minimum turning-on loss and a minimum turning-off loss.

2. Employing a soft switching circuit, through which the turning-on loss or the turning-off loss of the power switch device can be reduced. However an additional soft switching circuit is typically required.

3. Employing semiconductor material with higher performance, such as a new generation wide band-gap device, which can reduce the loss of semiconductor device. However this method typically causes an increased cost of the semiconductor device.

SUMMARY OF THE INVENTION

In view of the above, it is an objective of the present application to provide a novel technical solution to reduce the loss of the power semiconductor device, thus the turning-on loss and the turning-off loss of the power electronic semiconductor device can be reduced while no additional soft switch circuit is required.

To achieve the above objective, the technical solutions are as follows.

A power switch circuit, comprising at least one switch, conversion of power supply is achieved by controlling the turning on or turning off of the at least one switch, wherein, the power switch circuit comprises at least one switch unit, the switch unit comprises at least one first switch and one second switch which are connected in parallel; a control sequence and control periods of the switch unit are constituted by control sequences and control periods of the switches comprised in the switch unit, wherein a turning-on loss of the first switch is smaller than a turning-on loss of the second switch, a turning-off loss of the first switch is larger than a turning-off loss of the second switch; during one controlling period of the switch unit, when the switch unit is controlled to be turned on, a moment when the first switch is turned on is controlled to be earlier than a moment when the second switch is turned on; and when the switch unit is controlled to be turned off, a moment when the first switch is turned off is controlled to be earlier than a moment when the second switch is turned off.

The switch unit disposed in the power switch circuit provided by the present disclosure can reduce the loss of the power switch circuit and improve the efficiency of the power switch circuit.

DETAILED DESCRIPTION OF THE INVENTION

Figure 1:
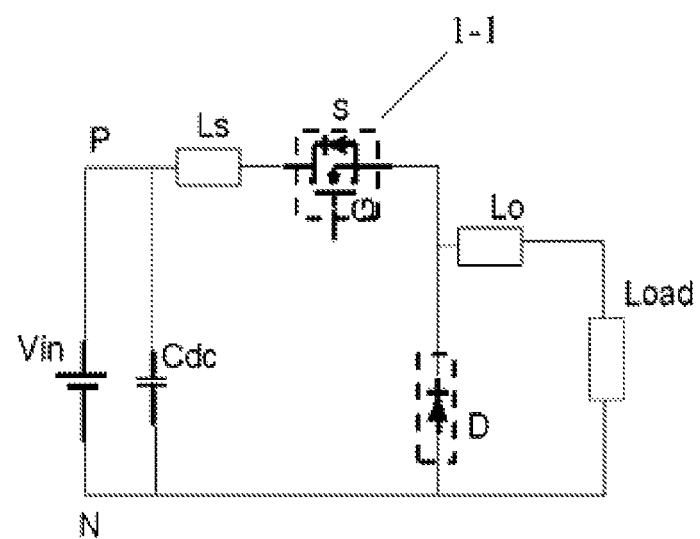
FIG. 1 shows a circuit diagram of a Buck circuit in the related art.

Detailed description of the present disclosure will be made with reference to drawings and embodiments. It shall be appreciated that the embodiments described herein are for the purposes of illustration but not to limit the present disclosure. In addition, it shall be noted that only the parts related to the present disclosure but not all the structures are shown in the drawings for the convenience of description.

Figure 2:
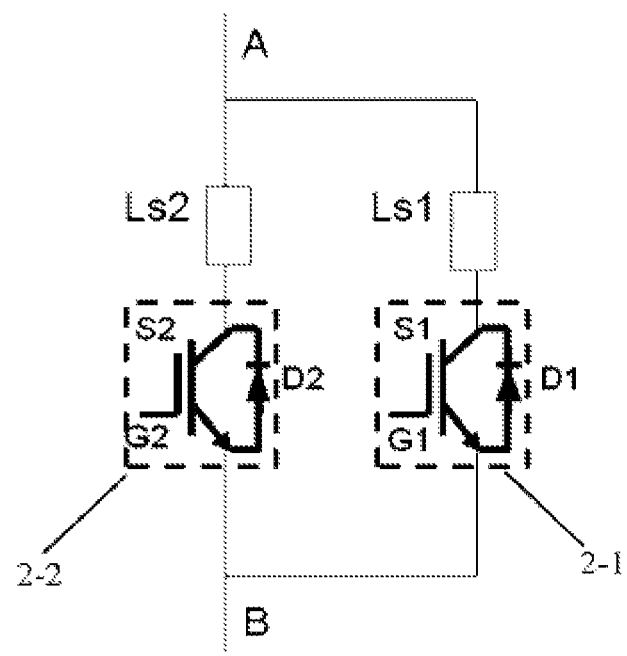
FIG. 2 shows a circuit diagram of a switch circuit according to the present disclosure.

The present disclosure provides a switch circuit, one embodiment of which is shown in FIG. 2. The switch circuit includes at least one switch unit, and the conversion of power supply can be achieved by controlling the turning-on and turning-off of the switch unit. The switch unit includes a first switch 2-1 and a second switch 2-2. In the present embodiment, the first switch 2-1 and the second switch 2-2 are both MOSFET switches. Such a MOSFET switch is typically connected in parallel with a diode, such as a diode D1 or a diode D2 illustrated in FIG. 2. In other embodiments, the first switch and the second switch may be switch devices of other types, such as a GaN HEMT switch, a SiC switch, or an IGBT switch. A parasitic inductor Ls1 represents a parasitic inductor of a branch where the first switch 2-1 is disposed, and a parasitic inductor Ls2 represents a parasitic inductor of a branch where the second switch 2-2 is disposed. In this switch circuit, the inductance value of the parasitic inductor Ls1 is much larger than that of the parasitic inductor Ls2. Since the inductance value of the parasitic inductor Ls1 is larger, the first switch 2-1 can have a lower turning-on loss, and since the inductance value of the parasitic inductor Ls2 is smaller, the second switch 2-2 can have a lower turning-off loss. Since the inductance value of the parasitic inductor Ls1 is much larger than that of the parasitic inductor Ls2, the turning-on loss of the first switch 2-1 is smaller than that of the second switch 2-2, and the turning-off loss of the first switch 2-1 is larger than that of the second switch 2-2.

This switch circuit is configured such that the turning-on loss of the first switch is smaller than that of the second switch and the turning-off loss of the first switch is larger than that of the second switch. In this switch circuit, the control sequence and control periods of the entire switch unit are combined by the control sequences and control periods of the first switch 2-1 and the second switch 2-2 connected in parallel, which are equivalent to the control sequence and control period of one switch 1-1 of the power switch circuit shown in FIG. 1. Since the turning-on loss of the first switch 2-1 is smaller than that of the second switch 2-2 and the turning-off loss of the first switch 2-1 is larger than that of the second switch 2-2, a lower turning-on loss and a lower turning-off loss of the entire switch unit can be achieved by controlling the sequences of turning on and turning off of the first switch 2-1 and the second switch 2-2.

Figure 3:
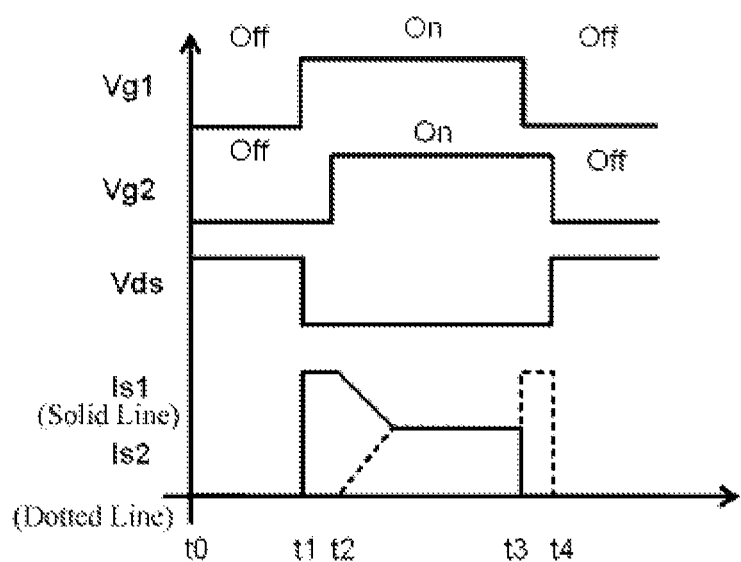
FIG. 3 is a schematic view showing a control sequence of the circuit shown in FIG. 2.

FIG. 3 shows a corresponding control method of the circuit configuration shown in FIG. 2. Vg1 is a control signal of the first switch 2-1, Vg2 is a control signal of the second switch 2-2, Vds is a terminal voltage between points A and B in FIG. 2, Is1 is a current of the first switch 2-1, and Is2 is a current of the second switch 2-2. The turning-on loss of the first switch 2-1 is smaller, and the turning-off loss of the second switch 2-2 is smaller. During one switching period, the first switch 2-1 and the second switch 2-2 are both in the off-state at the time of t0. The first switch 2-1 is turned on firstly at the time of t1, and the second switch 2-2 is turned on later at the time of t2. Since the first switch 2-1 has been completely turned on at the time when the second switch 2-2 is turned on, the second switch 2-2 is turned on at a zero voltage, thus the turning-on loss of the second switch 2-2 is almost zero. The first switch 2-1 is turned off firstly at the time of t3, and the second switch 2-2 is turned off later at the time of t4. Since the first switch 2-1 is turned off before the second switch 2-2, the first switch 2-1 is turned off at a zero voltage and the turning-off loss of the first switch 2-1 is almost zero. Thus, a lower turning-on loss and a lower turning-off loss of the entire circuit can both be achieved by controlling the sequence of turning on and turning off of the first switch 2-1 and the second switch 2-2 connected in parallel.

Hereinafter, examples of some implementations are given in which it can be achieved the turning-on loss of the first switch being smaller than that of the second switch and the turning-off loss of the first switch being larger than that of the second switch. A simple implementation is achieved through a parasitic inductance parameter of the respective branch where the first switch 2-1 or the second switch 2-2 is disposed. The inductance value of the parasitic inductor of the branch where the first switch is disposed can be much larger than that of the branch where the second switch is disposed, thereby achieving the turning-on loss of the first switch being smaller than that of the second switch and the turning-off loss of the first switch being larger than that of the second switch. Preferably, in this implementation, the parasitic inductance value of the first switch can be provided to be greater than or equal to five times of that of the second switch, such that the difference between the turning-on loss of the first switch 2-1 and the turning-on loss of the second switch 2-2 or between the turning-off loss of the first switch 2-1 and the turning-off loss of the second switch 2-2 can be more significant. Another implementation is that the first switch and the second switch are configured to be switch devices of different types, such that the turning-on loss and the turning-off loss of the first switch and the turning-on loss and turning-off loss of the second switch are significantly different. Here, switch devices of different types can have two embodiments. A first embodiment refers to switches of different types. For example, the switch 2-1 is an IGBT (Insulated Gate Bipolar Transistor) and the switch 2-2 is a MOSFET (Metal-Oxide-Semiconductor Field Effect Transistor). The turning-off loss of the switch 2-2 is smaller, and the switch 2-2 is controlled to be turned off later, thus a lower turning-off loss can be achieved. However, switch devices of different types, such as GaN HEMT, SiC MOS, IGBT and MOSFET, which are connected in parallel can also be employed.

A second embodiment is that the first switch and the second switch are switch devices of the same type but of different models. For example, the first switch 2-1 and the second switch 2-2 are IGBT switch devices with different rating currents. The first switch 2-1 is an IGBT with a larger rating current, and the second switch 2-2 is an IGBT with a smaller rating current. The turning-off loss of the second switch 2-2 is smaller, and the second switch 2-2 is controlled to be turned off later, thus a lower turning-off loss can be achieved.

Hereinafter, topologies of five kinds of specific power switch circuits are given as examples, however, in the present disclosure, the application of the switch unit is not limited to these five kinds of power switch circuits. The switch unit in the present disclosure can reduce the loss of power switch circuit, thus the efficiency of the power switch circuit can be improved.

The First Embodiment

A Buck circuit is described in this embodiment, which applies the above described power switch circuit of the present disclosure.

Figure 4:
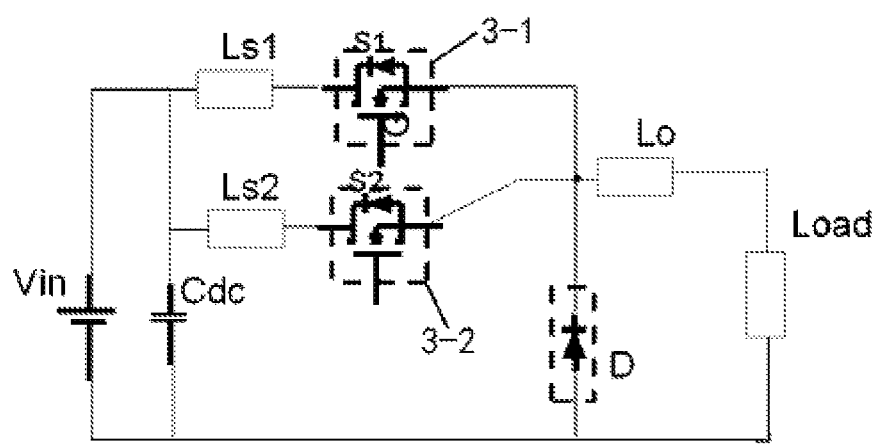
FIG. 4 shows a circuit diagram of a Buck circuit according to a first embodiment of the present disclosure.

FIG. 4 shows the circuit diagram of the Buck circuit according to the present embodiment. The difference between the Buck circuit shown in FIG. 4 and that shown FIG. 1 is that the single switch in FIG. 1 is replaced with a switch unit in FIG. 4. As illustrated in FIG. 4, the switch unit includes a first switch 3-1 and a second switch 3-2. The first switch 3-1 is connected in series with an equivalent parasitic inductor Ls1 of the branch where the first switch 3-1 is disposed, and the second switch 3-2 is connected in series with an equivalent parasitic inductor Ls2. The first switch 3-1 and the second switch 3-2 are connected in parallel. The Buck circuit also includes a fly-wheel diode D, an input voltage Vin, an input capacitor Cdc, an output filtering inductor Lo and an output load (Load).

The input voltage Vin is connected in parallel with the input capacitor Cdc, the switch unit constituted by the first switch 3-1 and the second switch 3-2 connected in parallel is connected to a positive voltage terminal of the input voltage Vin, the fly-wheel diode D is connected to a negative voltage terminal of the input voltage Vin, a midpoint between the switch unit and the fly-wheel diode D is connected with the output filtering inductor Lo and the output load (Load). In the present embodiment, the first switch 3-1 and the second 3-2 are MOSFETs, and the inductance value of Ls1 is much larger than that of Ls2. As described above, since the inductance value of Ls1 is larger than that of Ls2, the first switch 3-1 having a parasitic inductor Ls1 with a larger inductance value allows the turning-on loss generated when the first switch 3-1 is turned on being lower than that generated when the second switch 3-2 is turned on; on the other hand, since the inductance value of Ls2 is smaller than that of Ls1, the second switch 3-2 having a parasitic inductor Ls2 with a smaller inductance value allows the turning-off loss generated when the second switch 3-2 is turned off being lower than that generated when the first switch 3-1 is turned off. The turning on and turning off of the first switch 3-1 and the turning on and turning off of the second switch 3-2 are controlled to be separately performed, thus a lower turning-on loss and a turning-off loss can both be achieved. The inductance values of the parasitic inductor Ls1 and the parasitic inductor Ls2 of the circuit can be obtained by various means. For example, the values can be determined by an electromagnetic field simulation instrument by modeling the circuit. In the Buck circuit of the present embodiment, presuming that an output voltage is 1.8 V, an output current (i.e. load) is 20 A, an operating frequency of the switch 3-1 or the switch 3-2 is 600 kHZ, it can be deduced that an ideal inductance value of Ls1 is in the range of 1 nH to 3 nH, and the inductance value of Ls2 is smaller than 0.2 nH.

Figure 5:
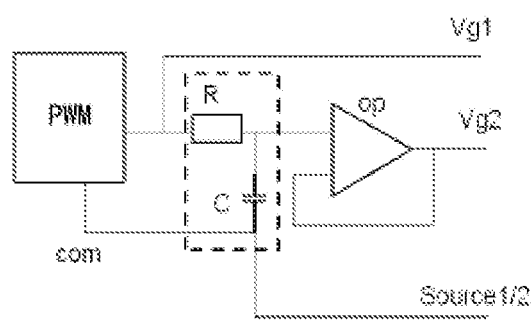
FIG. 5 is a schematic view showing a circuit sending a gate driving signal.

The control for the first switch and the second switch has been described above, thus the descriptions thereof will not be repeated. Hereinafter, how to generate control signals of the first switch and the second switch in the switch unit as illustrated in FIG. 3 will be given with examples. As illustrated in FIG. 5, a method for generating two cooperated control signals for the switch unit is provided. For example, the control signals are PWM control signals. A signal Vg is sent by a PWM controller and connected to Vg1, serving as a gate driving signal of the switch 3-1. Vg is connected to Vg2 through a delay circuit configured by a resistor R, a capacitor C and an operational amplifier Op, serving as a gate driving signal of the switch 3-2. One terminal of the capacitor is connected to the operational amplifier Op, the other terminal of the capacitor is connected to a common terminal (com) of the PWM controller, and then connected to a source terminal S1/source terminal S2 of the switch 3-1/switch 3-2.

A delay time ΔT can be changed by adjusting the values of R, C, the larger the values of R and C are, the longer the delay time ΔT will be. On the one hand, the delay time ΔT should be larger than the time period of turning on or turning off of switch 3-1, thereby switch 3-2 begins to be turned on or turned off subsequent to completing the turning on or turning off of switch 3-1, so that turning-on of switch 3-2 with a zero voltage and turning-off of switch 3-1 with a zero voltage can be achieved; on the other hand, if the delay time ΔT is too long, the on time for respectively of the switch 3-1 or switch 3-2 can be increased, thus an additional conduction loss may be generated. Therefore, an appropriate value for the delay time ΔT should be selected.

The selection of the delay time is mainly depended on the speed of turning on or turning off of the device. In the Buck circuit of the present embodiment, a MOSFET switch device is employed, the time period of turning on is about 1 ns~50 ns (nanosecond), and an ideal delay time ΔT can be in the range of 3 ns~100 ns. If a faster device, such as a GaN HEMT, is employed, an ideal time ΔT can be in the range of 1 ns~40 ns. If a slower device, such as an IGBT, is employed, an ideal time ΔT can be in the range of 100 ns~10 μs.

However, since the process of turning on the switch device may not be the same as that of turning off the switch device, the time period of t4–t3 can be different from the time period of t2–t1 as illustrated in FIG. 3.

The Second Embodiment

The power switch circuit described in this embodiment is a Boost circuit.

Figure 6:
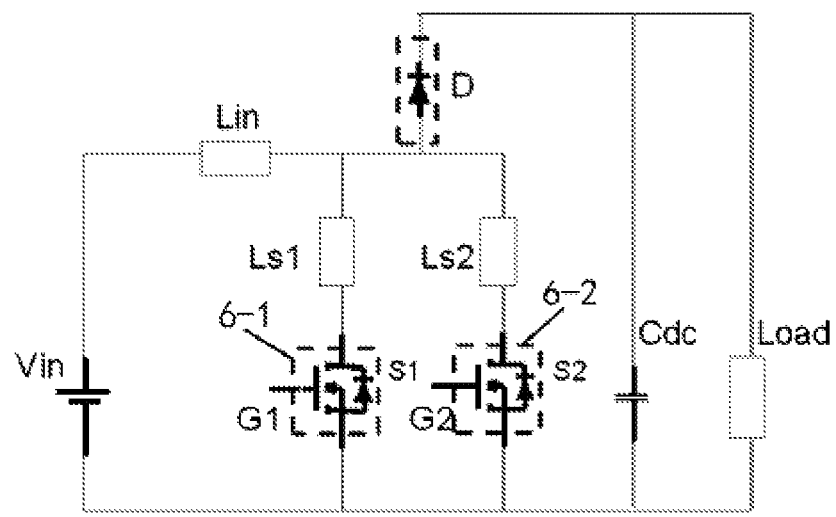
FIG. 6 shows a circuit diagram of a Boost circuit according to a second embodiment of the present disclosure.

FIG. 6 shows the circuit diagram of the Boost circuit according to the present embodiment. As illustrated in FIG. 6, the switch unit in the Boost circuit includes a first switch 6-1 and a second switch 6-2. A parasitic inductor Ls1 is connected in series in the branch where the first switch 6-1 is disposed, and a parasitic inductor Ls2 is connected in series in the branch where the second switch 6-2 is disposed. The first switch 6-1 and the second switch 6-2 are connected in parallel. The Boost circuit also includes a fly-wheel diode D, an input voltage Vin, an output capacitor Cdc, an input filtering inductor Lin and an output load (Load).

In the switch unit, the first switch 6-1 and the second switch 6-2 are connected in parallel. The input voltage Vin is connected in series with the input filtering inductor Lin, and connected to the midpoint between the fly-wheel diode D and the switch unit. The output load (Load) is connected in parallel with the output capacitor Cdc which has a positive voltage terminal and a negative voltage terminal, the switch unit is connected to the negative voltage terminal, and the fly-wheel diode D is connected to the positive voltage terminal.

In the present embodiment, the first switch 6-1 and the second switch 6-2 in the switch unit are both MOSFETs, D is a diode, the inductance value of Ls1 is much larger than that of Ls2 (the inductance value of Ls1 is at least five times that of Ls2). As above described, since the inductance value of Ls1 is larger than that of Ls2, the first switch having a parasitic inductor Ls1 with a larger inductance value allows the turning-on loss generated when the first switch 6-1 is turned on being lower than that generated when the second switch 6-2 is turned on; on the other hand, since the inductance value of Ls2 is smaller than that of Ls1, the second switch having a parasitic inductor Ls2 with a smaller inductance value allows the turning-off loss generated when the second switch 6-2 is turned off being lower than that generated when the first switch 6-1 is turned off. The turning on and turning off of the first switch 6-1 and the second switch 6-2 are controlled to be separately performed, thus a lower turning-on loss and a turning-off loss can both be achieved.

In the present embodiment, for example, in the Boost circuit, in case where the output voltage is 400 V, the output current (i.e. load) is 4 A, and the operating frequency of the switch elements is 100 kHZ, an ideal inductance value of Ls1 is in the range of 10 nH to 20 nH, and the inductance value of Ls2 is smaller than 2 nH.

The corresponding controlling method for the circuit in FIG. 6 can also be referred to FIG. 3. The gate control signals of the switch devices 6-1 and 6-2 are the same as those of the above described Buck circuit. As illustrated in FIG. 3, during one switching period, the switch devices 6-1 and 6-2 are both in the off-state at the time of t0, the switch 6-1 is turned on firstly at the time of t1, then the switch 6-2 is turned on at the time of t2 after a delay time ΔT. The switch 6-1 is turned off firstly at the time of t3, then the switch 6-2 is turned off at the time of t4 after a delay time ΔT. Since the switch 6-2 is turned on at a zero voltage and the turning-on loss of the switch 6-2 is almost zero; the switch 6-1 is turned off at a zero voltage and the turning-off loss of the switch 6-1 is almost zero. Thus, lower turning-on loss and lower turning-off loss of the switch unit can both be achieved. The selection of corresponding delay time are basically the same as the above described examples.

The Third Embodiment

The power switch circuit described in this embodiment is a half bridge circuit.

Figure 7:
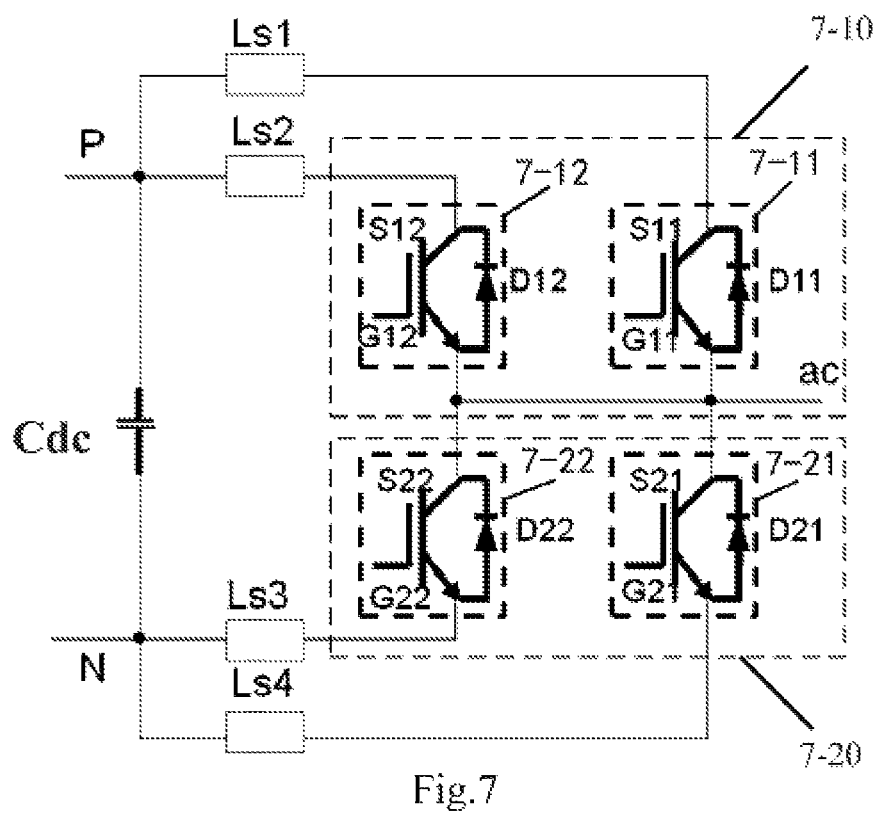
FIG. 7 shows a circuit diagram of a half-bridge circuit according to a third embodiment of the present disclosure.

FIG. 7 shows the circuit diagram of the half bridge circuit according to the present embodiment. As illustrated in FIG. 7, the half bridge circuit includes two switch units, that is the first switch unit 7-10 and the second switch unit 7-20. In the present embodiment, the control sequences of two switch units are complementary to control the two switch units to be turned on and turned off alternately. The first switch and second switch in the switch units of the present embodiment are both IGBT switches.

The first switch unit 7-10 includes a first switch 7-11 and a second switch 7-12. The first switch 7-11 is connected in anti-parallel with a diode D11, and a parasitic inductor Ls1 is connected in series with the first switch 7-11 in the branch where the first switch 7-11 is disposed; the second switch 7-12 is connected in anti-parallel with a diode D12, and a parasitic inductor Ls2 is connected in series with the second switch 7-12 in the branch where the second switch 7-12 is disposed. The first switch 7-11 and the second switch 7-12 are connected in parallel.

The second switch unit 7-20 includes a first switch 7-21 and a second switch 7-22. The first switch 7-21 is connected in anti-parallel with a diode D21, and a parasitic inductor Ls3 connected in series with the first switch 7-21 in the branch where the first switch 7-21 is located; the second switch 7-22 is connected in anti-parallel with a diode D22, and a parasitic inductor Ls4 is connected in series with the second switch in the branch where the second switch 7-22 is located. The first switch 7-21 and the second switch 7-22 are connected in parallel.

The half bridge circuit also includes a direct current capacitor Cds which has a positive voltage terminal P and a negative voltage terminal N, the first switch unit 7-10 is connected to the positive voltage terminal P and the second switch unit 7-20 is connected to the negative voltage terminal N. The midpoint between the first switch unit 7-10 and the second switch unit 7-20 is connected to an ac terminal.

An AC voltage is provided at the ac terminal by controlling the first switch unit 7-10 and the second switch unit 7-20 to be turned on alternatively. When the first switch unit 7-10 is in the on-state, a high voltage is provided at the ac terminal, and when the second switch unit 7-20 is in the on-state, a low voltage is provided at the ac terminal.

The inductance value of the parasitic inductor Ls1 is much larger than that of the parasitic inductor Ls2 (the inductance value of Ls1 is at least five times that of Ls2), the inductance value of the parasitic inductor Ls4 is much larger than that of the parasitic inductor Ls3 (the inductance value of Ls4 is at least five times that of Ls3). As described above, since the inductance value of Ls1 is larger than that of Ls2, the branch where the first switch 7-11 is disposed has the parasitic inductor Ls1 with a larger inductance value, thus the turning-on loss generated when the first switch 7-11 is turned on is lower than that generated when the second switch 7-12 is turned on; on the other hand, as described above, since the inductance value of Ls2 is smaller than that of Ls1, the branch where the second switch 7-12 is disposed has the parasitic inductor Ls2 with a smaller inductance value, thus the turning-off loss generated when the second switch 7-12 is turned off is lower than that generated when the first switch 7-11 is turned off. The turning on and turning off of the first switch and the second switch are controlled to be separately performed, thus the lower turning-on loss and turning-off loss can both be achieved. Based on the same principle, the turning on and turning off of the first switch 7-21 and the second switch 7-22 in the second switch unit 7-20 can be controlled to be separately performed, thus the lower turning-on loss and turning-off loss can both be achieved.

Figure 8:
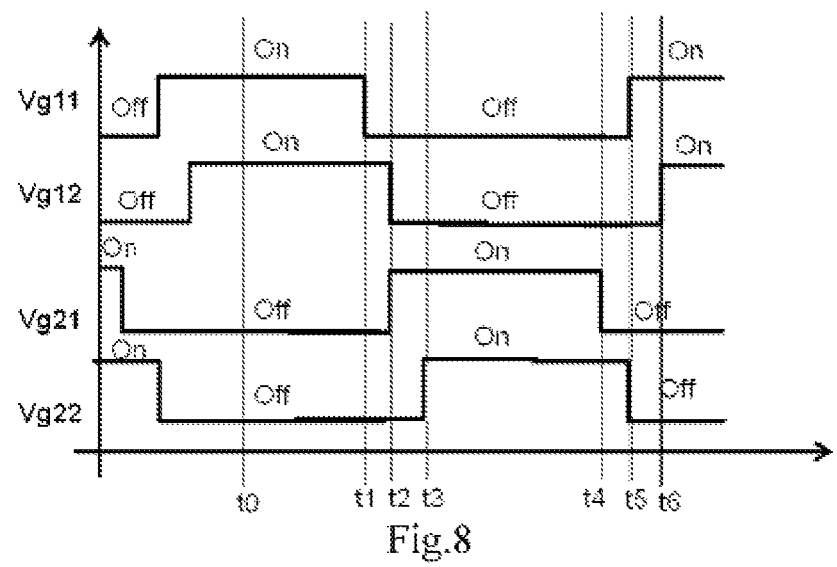
FIG. 8 is a schematic view showing a control sequence of the circuit shown in FIG. 7.

In the half bridge of the present embodiment, an ideal inductance value of the parasitic inductor Ls1 (Ls4) is in the range of 10 nH to 50 nH, and the inductance value of the parasitic inductor Ls2 (Ls3) is smaller than 5 nH. FIG. 8 shows the corresponding method of the circuit configuration shown in FIG. 7. The corresponding gate control signals of the first switch 7-11 and the second switch 7-12 in the first switch unite and of the first switch 7-21 and the second switch 7-22 in the second switch unit are respectively Vg11, Vg12, Vg21 and Vg22. As illustrated in FIG. 8, in one embodiment, during one switching period, the signals of S21, S22 and the signals of S11, S12 are complementary, such that the switch 7-12 is turned on or turned off after a delay time $\Delta T$ ($\Delta T=t2-t1$) since the switch 7-11 is turned on or turned off; the switch 7-22 is turned on and turned off after a delay time $\Delta T$ ($\Delta T=t3-t2$) since the switch 7-21 is turned on or turned off. The detailed operation is as follows: at the time of t0, the switch 7-11 and the switch 7-12 are both in the on-state, the switch 7-21 and the switch 7-22 are both in the off-state; the switch 7-11 is turned off firstly at the time of t1, the switch 7-12 is turned off later at the time of t2; the switch 7-21 is turned on firstly at the time of t2, the switch 7-22 is turned on later at the time of t3; the switch 7-21 is turned off firstly at the time of t4, the switch 7-22 is turned off later at the time of t5; the switch 7-11 is turned on firstly at the time of t5, and the switch 7-12 is turned on later at the time of t6. Thus, a lower turning-on loss and a lower turning-off loss of the entire half bridge circuit can both be achieved. The delay time of turning on and turning off may be different, that is, t2-t1 is different from t6-t5, and t3-t2 is also different from t5-t4. The selection of corresponding delay time is the same with the above described examples.

The Fourth Embodiment

The power switch circuit described in this embodiment is a T-Type three-level circuit.

Figure 9:
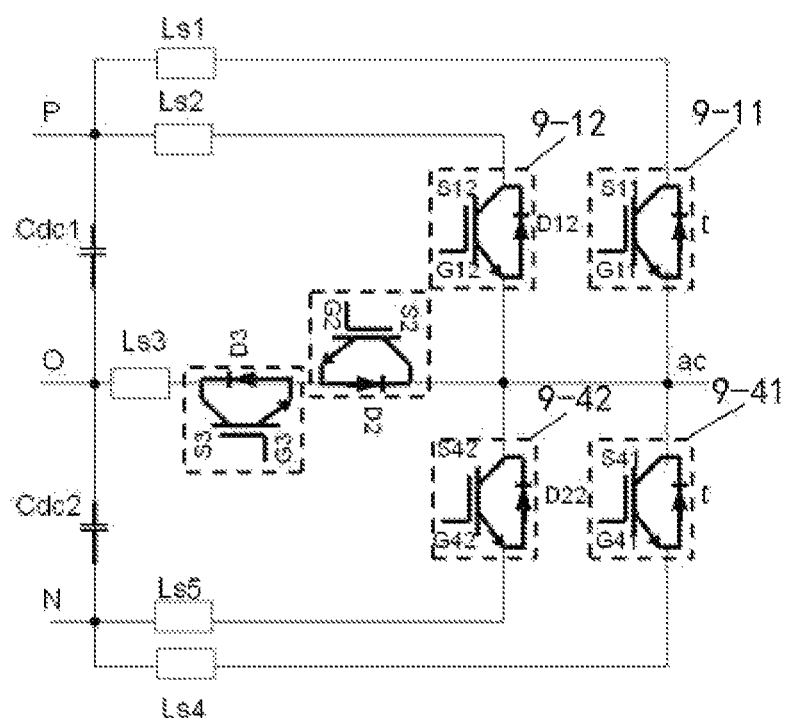
FIG. 9 shows a circuit diagram of a T-Type three-level circuit according to a fourth embodiment of the present disclosure.

FIG. 9 shows the circuit diagram of the T-Type three-level circuit according to the present embodiment. As illustrated in FIG. 9, the T-Type three-level circuit includes two switch units. The first switch and second switch contained in each switch unit are both IGBT switch devices.

The first switch unit includes a first switch 9-11 and a second switch 9-12. The first switch 9-11 is connected in anti-parallel with a diode D11, and a parasitic inductor Ls1 is connected in series with the first switch 9-11 in the branch where the first switch 9-11 is disposed; the second switch 9-12 is connected in anti-parallel with a diode D12, and a parasitic inductor Ls2 is connected in series with the second switch 9-12 in the branch where the second switch 9-12 is disposed. The first switch 9-11 and the second switch 9-12 are connected in parallel.

The second switch unit includes a first switch 9-41 and a second switch 9-42. The first switch 9-41 is connected in anti-parallel with a diode D41, and a parasitic inductor Ls4 is connected in series with the first switch S41 in the branch where the first switch S41 is disposed; the second switch 9-42 is connected in anti-parallel with a diode D42, and a parasitic inductor Ls5 is connected in series with the second switch 9-42 in the branch where the second switch 9-42 is disposed. The first switch and the second switch are connected in parallel.

The T-Type three-level circuit also includes direct current capacitors Cdc1 and Cdc2, a neutral bridge arm switch S2, a diode D2 connected in parallel with S2, a neutral bridge arm switch S3, a diode D3 connected in parallel with S3, and a parasitic inductor Ls3 connected in series with S2 and S3. Cdc1 has a positive voltage terminal P and a zero voltage terminal O, Cdc2 has a negative voltage terminal N and a zero voltage terminal O; the first switch unit is connected to the positive voltage terminal P, the second switch unit is connected to the negative voltage terminal N; the midpoint between the first switch unit and the second switch unit is connected to an ac terminal; the branch of S3 connecting in parallel with D3 is connected in series with the branch of S2 connecting in parallel with D2, one terminal of the neutral bridge arm switch S3 is electrically connected to the zero voltage terminal O, and one terminal of the neutral bridge arm switch S2 is electrically connected to the ac terminal.

A positive AC voltage or a negative AC voltage is provided at the ac terminal by controlling the first switch unit and the second switch unit to be turned on alternatively. When the first switch unit is in the on-state, a positive voltage is provided at the ac terminal, and when the second switch unit is in the on-state, a negative voltage is provided at the ac terminal. When S2 and S3 are in the on-state, a zero voltage is provided at the ac terminal.

Similarly, in the present embodiment, the inductance value of the parasitic inductor Ls1 is much larger than that of the parasitic inductor Ls2 (the inductance value of the parasitic inductor Ls4 is much larger than that of the parasitic inductor Ls5). As above described, since the inductance value of Ls1 is larger than that of Ls2, the branch where the first switch 9-11 is disposed has the parasitic inductor Ls1 with a larger inductance value, thus the turning-on loss generated when the first switch 9-11 is turned on is lower than that generated when the second switch 9-12 is turned on; on the other hand, as described above, since the inductance value of Ls2 is smaller than that of Ls1, the branch where the second switch 9-12 is disposed has the parasitic inductor Ls2 with a smaller inductance value, thus the turning-off loss generated when the second switch 9-12 is turned off is lower than that generated when the first switch 9-11 is turned off. The turning on and turning off of the first switch and the second switch are controlled to be separately performed, thus the lower turning-on loss and turning-off loss can both be achieved. Based on the same principle, the turning on and turning off of the first switch and the second switch in the second switch unit can be controlled to be separately performed, thus the lower turning-on loss and turning-off loss can both be achieved.

In the T-Type three-level circuit of the present embodiment, an ideal inductance value of the parasitic inductor Ls1 (Ls4) is in the range of 10 nH to 50 nH, and the inductance value of the parasitic inductor Ls2 (Ls5) is smaller than 5 nH. The inductance value of Ls1 (Ls4) is more than five times that of Ls2 (Ls5).

Figure 10:
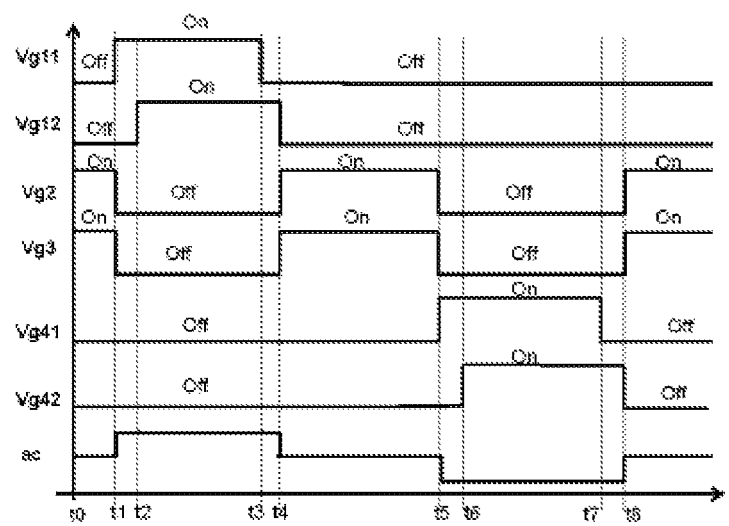
FIG. 10 is a schematic view showing a control sequence of the circuit shown in FIG. 9.

FIG. 10 shows the corresponding method of the circuit configuration shown in FIG. 9. The corresponding gate control signals of switch devices 9-11, 9-12, S2, S3, 9-41 and 9-42 are respectively Vg11, Vg12, Vg2, Vg3, Vg41 and Vg42. As illustrated in FIG. 10, during the half period of outputting a positive voltage, the voltage at the ac terminal varies between a positive voltage and a zero voltage, the second switch 9-12 is turned on or turned off after a delay time ΔT (ΔT=t2−t1) since the first switch 9-11 is turned on or turned off. The detailed operation is as follows: switches 9-11, 9-12, 9-41 and 9-42 are in the off-state, and S2 and S3 are in the on-state at the time of t0; S2 and S3 are turned off at the time of t1, the first switch 9-11 is turned on firstly at the time of t1, the second switch 9-12 is turned on later at the time of t2; the first switch 9-11 is turned off firstly at the time of t3, the second switch 9-12 is turned off later at the time of t4, S2 and S3 are turned on subsequently. During the half period of outputting a negative voltage, the voltage at the ac terminal varies between a zero voltage and a negative voltage, the second switch 9-42 is turned on or turned off after a delay time ΔT (ΔT=t6−t5) since the first switch 9-41 is turned on or turned off. The detailed operation is as follows: at the time of t4, switches 9-11, 9-12, 9-41 and 9-42 are in the off-state, S2 and S3 are in the on-state; S2 and S3 are turned off at the time of t5, the first switch 9-41 is turned on firstly at the time of t5, the second switch 9-42 is turned on later at the time of t6; the first switch 9-41 is turned off firstly at the time of t7, the second switch 9-42 is turned off later at the time of t8, S2 and S3 are turned on subsequently. Thus, a lower turning-on loss and a lower turning-off loss of the entire T-Type three-level circuit can both be achieved.

The selection of the delay time is mainly depended on the speed of turning on or turning off of the switch device. In case where a MOSFET switch device is employed, the time for the process of turning on is about in the range of 5 ns~50 ns, and an ideal delay time ΔT can be in the range of 10 ns to 100 ns. If a faster device, such as a GaN HEMT, is employed, an ideal time ΔT can be in the range of 5 ns to 40 ns. If a slower device, such as an IGBT, is employed, an ideal Time ΔT can be in the range of 100 ns to 10 μs (microsecond).

The Fifth Embodiment

Figure 11:
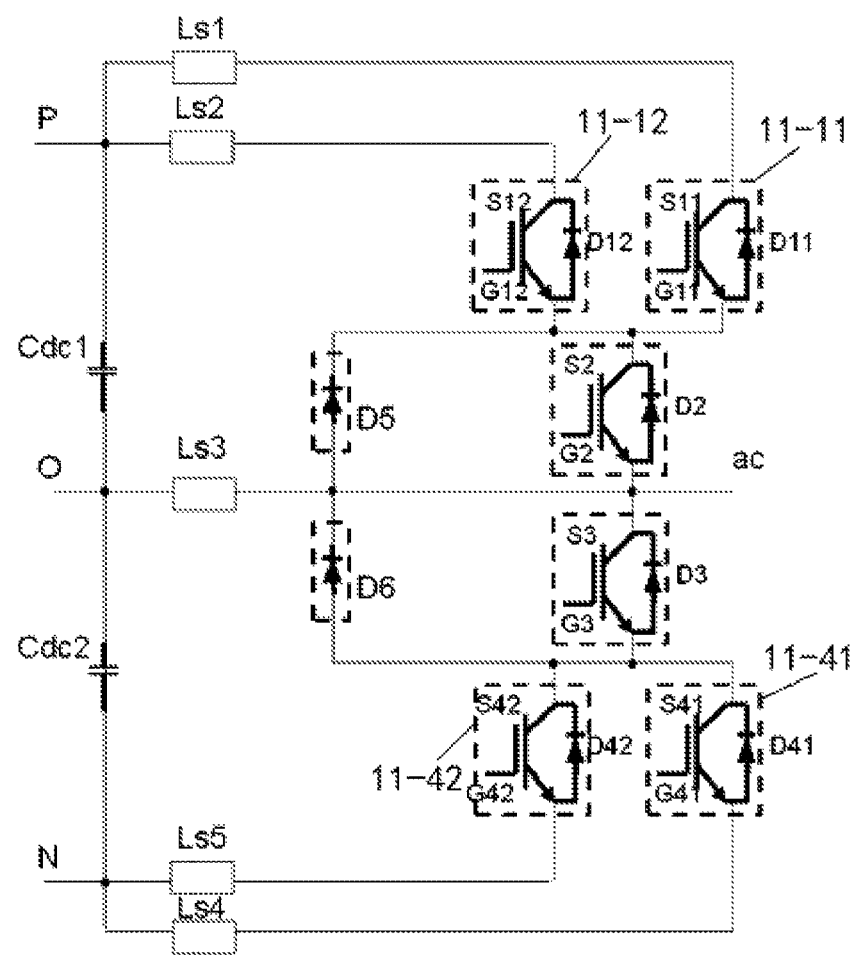
FIG. 11 shows a circuit diagram of a diode-clamping three-level circuit according to a fifth embodiment of the present disclosure.

The power switch circuit described in this embodiment is a diode-clamping three-level circuit. FIG. 11 shows the circuit diagram of the diode-clamping three-level circuit according to the present embodiment. As illustrated in FIG. 11, the diode-clamping three-level circuit includes two switch units. In the present embodiment, the first switch and second switch in the switch units are both IGBT switch devices.

The first switch unit includes a first switch 11-11 and a second switch 11-12. The first switch 11-11 is connected in anti-parallel with a diode D11, and a parasitic inductor Ls1 is connected in series with the first switch 11-11 in the branch where the first switch 11-11 is disposed; the second switch 11-12 is connected in anti-parallel with a diode D12, and a parasitic inductor Ls2 is connected in series with the second switch 11-12 in the branch where the second switch 11-12 is disposed. The first switch 11-11 and the second switch 11-12 are connected in parallel.

The second switch unit includes a first switch 11-41 and a second switch 11-42. The first switch 11-41 is connected in anti-parallel with a diode D41, and a parasitic inductor Ls4 is connected in series with the first switch S41 in the branch which the first switch S41 is disposed; the second switch 11-42 is connected in anti-parallel with a diode D42, and a parasitic inductor Ls5 is connected in series with the second switch 11-42 in the branch where the second switch 11-42 is disposed. The first switch 11-41 and the second switch 11-42 are connected in parallel.

The diode-clamping three-level circuit also includes direct current capacitors Cdc1 and Cdc2, a neutral bridge arm switch S2, a diode D2 connected in anti-parallel with S2, a neutral bridge arm switch S3, a diode D3 connected in anti-parallel with S3, a diode D5, a diode D6, a parasitic inductor Ls3 connected in series with D5 and D6. Cdc1 has a positive voltage terminal P and a zero voltage terminal O, Cdc2 has a negative voltage terminal N and a zero voltage terminal O; the first switch unit is connected to the positive voltage terminal P, the second switch unit is connected to the negative voltage terminal N. The two terminals of the branch of D5 and D6 connected in series are respectively connected to the first switch unit and the second switch unit, the midpoint between D5 and D6 is connected to the zero voltage terminal O, and a parasitic inductor Ls3 is disposed between D5 or D6 and the zero voltage terminal O, the two terminals of the branch of S2 and S3 connected in series are respectively connected to the first switch unit and the second switch unit, and the midpoint between S2 and S3 is connected to the ac terminal.

A positive AC voltage or a negative AC voltage is provided at the ac terminal by controlling the first switch unit and the second switch unit to be turned on alternatively. When the first switch unit is in the on-state, a positive voltage is provided at the ac terminal, when the second switch unit is in the on-state, a negative voltage is provided at the ac terminal, and when S2 and D5 are turned on or S3 and D6 are turned on, a zero voltage is provided at the ac terminal.

In the present embodiment, the inductance value of Ls1 is much larger than that of Ls2 (the inductance value of Ls1 is at least five times that of Ls2), the inductance value of Ls4 is much larger than that of Ls5 (the inductance value of Ls4 is at least five times that of Ls5). As described above, since the inductance value of Ls1 is larger than that of Ls2, the branch where the first switch 11-11 is disposed has the parasitic inductor Ls1 with a larger inductance value, thus the turning-on loss generated when the first switch 11-11 is turned on is lower than that generated when the second switch 11-12 is turned on; on the other hand, as described above, since the inductance value of Ls2 is smaller than that of Ls1, the branch where the second switch 11-12 is disposed has the parasitic inductor Ls2 with a smaller inductance value, thus the turning-off loss generated when the second switch 11-12 is turned off is lower than that generated when the first switch 11-11 is turned off. The turning on and turning off of the first switch 11-11 and the second switch 11-12 are controlled to be separately performed, thus the lower turning-on loss and turning-off loss can both be achieved. According to the same principle, the turning on and turning off of the first switch 11-41 and the second switch 11-42 in the second switch unit can be controlled to be separately performed, thus the lower turning-on loss and turning-off loss can both be achieved.

Figure 12:
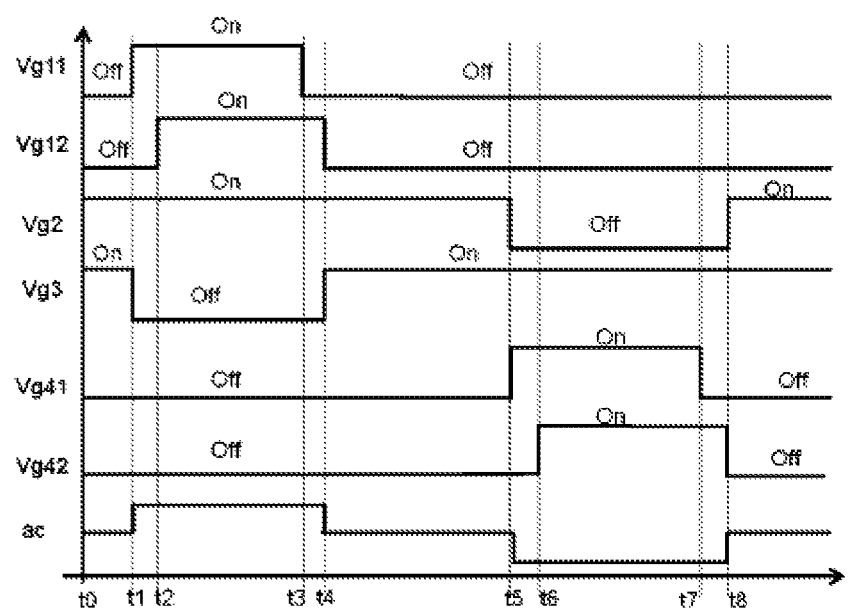
FIG. 12 is a schematic view showing a control sequence of the circuit shown in FIG. 11.

In the diode-clamping three-level circuit of the present embodiment, an ideal inductance value of the parasitic inductor Ls1 (Ls4) is in the range of 10 nH to 50 nH, the inductance value of the parasitic inductor Ls2 (Ls5) is smaller than 5 nH. FIG. 12 shows the corresponding method of the circuit configuration shown in FIG. 11. The corresponding gate control signals of the switch devices 11-11, 11-12, S2, S3, 11-41 and 11-42 are respectively Vg11, Vg12, Vg2, Vg3, Vg41 and Vg42. As illustrated in FIG. 12, during the half period of outputting a positive voltage, the voltage at the ac terminal varies between a positive voltage and a zero voltage, the second switch 11-12 is turned on or turned off after a delay time $\Delta T$ ($\Delta T=t2-t1$) since the first switch 11-11 is turned on or turned off. The detailed operation is as follows: at the time of t0, switch devices 11-11, 11-12, 11-41 and 11-42 are in the off-state, S2 and S3 are in the on-state; S3 is turned off at the time of t1, the first switch 11-11 is turned on firstly at the time of t1, the second switch 11-12 is turned on later at the time of t2; the first switch 11-11 is turned off firstly at the time of t3, the second switch 11-12 is turned off later at the time of t4, S3 is turned on subsequently. During the half period of outputting a negative voltage, the voltage at the ac terminal varies between a zero voltage and a negative voltage, the second switch 11-42 is turned on or turned off after a delay time $\Delta T$ ($\Delta T=t6-t5$) since the first switch 11-41 is turned on or turned off. The specific operation is as follows: at the time of t4, switch devices 11-11, 11-12, 11-41 and 11-42 are in the off-state, S2 and S3 are in the on-state; S3 is turned off at the time of t5, the first switch 11-41 is turned on firstly at the time of t5, the second switch 11-42 is turned on later at the time of t6; the first switch 41 is turned off firstly at the time of t7, the second switch 11-42 is turned off later at the time of t8, S2 is turned on subsequently. Thus, a lower turning-on loss and a lower turning-off loss of the entire T-Type three-level circuit can both be achieved.

The selection of the respective delay time is illustrated. The selection of the delay times of the switches of the switch units is mainly depended on the speed of turning on or turning off of the switch device. In case where a MOSFET switch device is employed, the time for the process of turning on is about in the range of 5 ns-50 ns, and an ideal delay time $\Delta T$ can be in the range of 10 ns to 100 ns. If a faster device, such as a GaN HEMT, is employed, an ideal time $\Delta T$ can be in the range of 5 ns to 40 ns. If a slower device, such as an IGBT, is employed, an ideal time $\Delta T$ can be in the range of 100 ns to 10 µs.

Five kinds of different power switch circuits are described in the first embodiment to the fifth embodiment aforementioned. However, in the switch units of these power switch circuits, the larger inductance value of the parasitic inductor of the branch where the first switch is disposed will cause the problem of the spike voltage when the first switch is turned off.

In order to solve this problem, for a switch in a branch where the parasitic inductor is larger in the switch unit, a voltage-clamping circuit can be connected in parallel across the switch to reduce the spike voltage across the switch. Take the Buck circuit in FIG. 4 as an example, the inductance value of the parasitic inductor Ls1 connected in series with the first switch 3-1 is larger, thus a higher spike voltage tends to be generated in the first switch 3-1 when it is turned off.

Figure 13:
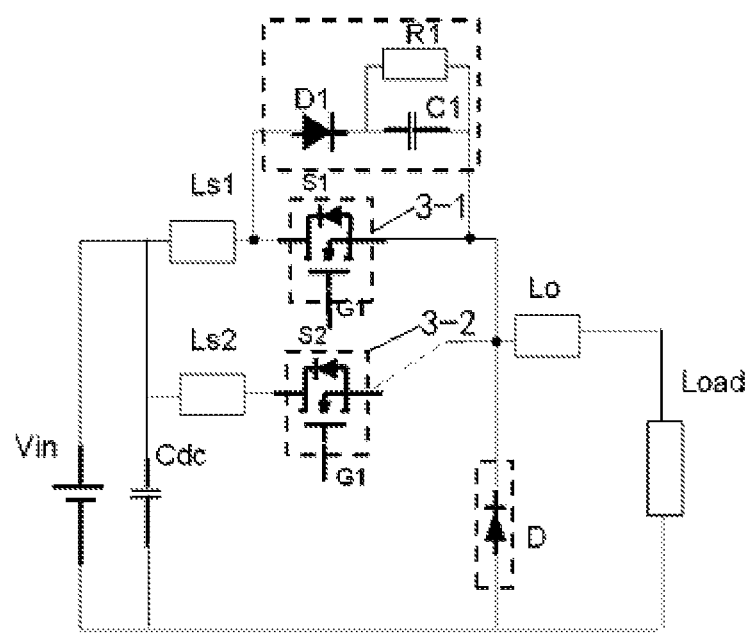
FIG. 13 shows a circuit diagram of a voltage-clamping circuit according to an embodiment of the present disclosure.

One method for resolving this problem is connecting a RCD clamping circuit in parallel across the first switch 3-1, as illustrated in FIG. 13. Wherein D1 is a clamping diode, C1 is a clamping capacitor, R1 is a bleeder resistor, the rest part is consistent with the Buck circuit shown in FIG. 4, and the descriptions thereof will not be repeated.

An anode of the clamping diode D1 is connected to one terminal of the first switch 3-1, one terminal of the clamping capacitor C1 is connected to another terminal of the first switch 3-1, the clamping diode D1 is connected in series with the clamping capacitor C1, the bleeder resistor R1 is connected in parallel with the clamping capacitor C1. When a higher spike voltage is generated across the first switch 3-1 and exceeds the voltage of the clamping capacitor C1, the voltage across the first switch 3-1 is clamped by the freewheeling current of the clamping diode D1, the energy charged to the clamping capacitor C1 when clamped can be released through R1.

Figure 14:
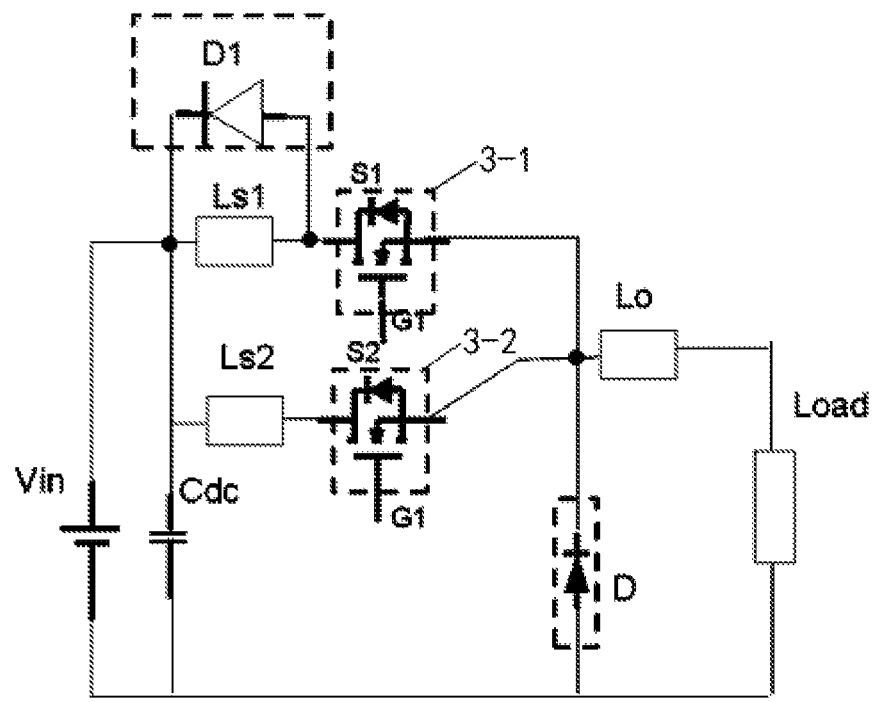
FIG. 14 shows a circuit diagram of another voltage-clamping circuit according to an embodiment of the present disclosure.

Another method for resolving the problem of the spike voltage across the switch in the branch in which parasitic inductor is larger in the switch unit is that connecting a clamping diode to the branch which the larger parasitic inductor is disposed, as illustrated in FIG. 14. Wherein D1 is a clamping diode, the rest part is consistent with the Buck circuit shown in FIG. 4, and the descriptions thereof will not be repeated.

An anode of the clamping diode D1 is connected to a drain terminal of the first switch 3-1, and a cathode of the clamping diode D1 is connected to the positive terminal of the capacitor Cdc. When the voltage at the drain terminal of the first switch 3-1 exceeds the voltage of the capacitor Cdc, the voltage at the drain terminal of the first switch 3-1 is clamped by the freewheeling current of the clamping diode D1.

The above described two kinds of clamping circuits are also applied to a Buck circuit, a Boost circuit, a half-bridge circuit, a diode-clamping three-level circuit, and a T-Type three-level circuit, and the descriptions thereof are omitted.

Although the switch units described as examples in the above embodiments only includes two switches connected in parallel, it can be seen from the principle of the above described switch units that, in practice, the switch unit can also include more than two switches connected in parallel, as long as the inductance value of the parasitic inductor of the branch where one part of the switches are disposed are significantly different (for example, larger than five times, as described above) from that of the branch where the other part of the switches are disposed. The turning on and turning off of the switches in the branch having a parasitic inductor with a larger inductance value is controlled to be firstly performed, and the turning on and turning off of the switches in the branch having a parasitic inductor with a larger inductance value is controlled to be firstly performed later, for control of the corresponding switch unit, thereby, the loss of the entire power switch circuit can be reduced. The application of this kind of switch unit can allow designers to choose several switches with small rated currents to constitute a switch unit with a larger rated current, so as to reduce the cost of the entire power switch circuit to some extent.

It shall be noted that the above description only illustrate exemplary embodiments and technology principles of the present disclosure. It will be appreciated by one of ordinary skilled in the art that the present disclosure is not limited to the particular embodiments described herein, and one of ordinary skilled in the art may make various variation, modification and substitutions without departing from the protection scope of the present disclosure. Thus, although the present disclosure is described in detail with reference to the above embodiments, the present disclosure is not limited to those embodiments, and other equivalent embodiments may be included without departing from the idea of the present disclosure. The scope of the present disclosure is defined by the scope of the appended claims.

What is claimed is:

1. A power switch circuit, comprising at least one switch unit, turning on or turning off of power supply being achieved by controlling the turning on or turning off of the switch unit, wherein the switch unit comprises at least two switches and corresponding inductors connected in parallel, the at least two switches are respectively at least one first switch and one second switch; an inductance of the first switch is larger than an inductance of the second switch; wherein a turning-on loss of the first switch is smaller than a turning-on loss of the second switch, a turning-off loss of the first switch is larger than a turning-off loss of the second switch; during one controlling period of the switch unit, when the switch unit is controlled to be turned on, a moment when the first switch is turned on is controlled to be earlier than a moment when the second switch is turned on; and when the switch unit is controlled to be turned off, a moment when the first switch is turned off is controlled to be earlier than a moment when the second switch is turned off.

2. The power switch circuit according to claim 1, wherein a time difference between the moment when the second switch is turned on and the moment when the first switch is turned on is at least longer than a time period required to complete the turning on of the first switch, and a time difference between the moment when the second switch is turned off and the moment when the first switch is turned off is at least longer than a time period required to complete the turning off of the first switch.

3. The power switch circuit according to claim 1, wherein the power switch circuit comprises only one said switch unit.

4. The power switch circuit according to claim 1, wherein the power switch circuit comprises two said switch units, and control sequences of the two switch units are complementary to control the two switch units to be turned on and turned off alternatively.

5. The power switch circuit according to claim 1, wherein an inductance value of a parasitic inductor of the first switch is larger than or equal to five times of an inductance value of a parasitic inductor of the second switch.

6. The power switch circuit according to claim 1, wherein a rated current of the first switch is larger than a rated current of the second switch.

7. The power switch circuit according to claim 1, wherein the first switch is connected in parallel with a voltage-clamping circuit to reduce a spike voltage generated when the first switch is turned off.

* * * * *